United States Patent
Adams, Sr. et al.

(10) Patent No.: US 6,937,796 B2
(45) Date of Patent: Aug. 30, 2005

(54) OPTICAL FIBER HEATING MODULE

(75) Inventors: Robert M. Adams, Sr., Pasadena, MD (US); Lowell Seal, Reisterstown, MD (US)

(73) Assignee: Corvis Corporation, Columbia, MD (US)

( * ) Notice: Subject to any disclaimer, the term of this patent is extended or adjusted under 35 U.S.C. 154(b) by 313 days.

(21) Appl. No.: 10/131,492

(22) Filed: Apr. 25, 2002

(65) Prior Publication Data

US 2003/0202771 A1 Oct. 30, 2003

(51) Int. Cl.$^7$ ................................................ G02B 6/24
(52) U.S. Cl. ........................ 385/40; 385/94; 385/147
(58) Field of Search ............................ 385/40, 88–94, 385/147

(56) References Cited

U.S. PATENT DOCUMENTS 6,567,600 B2 * 5/2003 Yoshida ...................... 385/134

OTHER PUBLICATIONS

MINCO: Thermofoil™ Heaters and Controllers; http://www.minco.com/heaters.php: Jan. 25, 2002; 3 pages.

* cited by examiner

Primary Examiner—Akm Enayet Ullah
Assistant Examiner—Jerry T Rahll
(74) Attorney, Agent, or Firm—Harrity & Snyder LLP

(57) ABSTRACT

A heating module keeps a length of erbium-doped optical fiber at a constant temperature. The heating module includes the erbium-doped optical fiber, a heating element, and a temperature sensor embedded in a flexible circuit substrate. Insulating and packaging layers may be placed around the flexible circuit substrate.

24 Claims, 4 Drawing Sheets

OPTICAL FIBER HEATING MODULE

FIELD OF THE INVENTION

The present invention relates generally to optical transmission systems and, more particularly, to systems and methods for implementing erbium-doped fiber amplifiers in optical transmission systems.

BACKGROUND OF THE INVENTION

Optical systems transmit information as optical signals through optical fiber. Optical transmission systems have come to the forefront as an important communication technology. Advances in optical fibers over which optical data signals can be transmitted, as well as techniques for efficiently using the bandwidth available on such fibers, such as wavelength division multiplexing (WDM), have resulted in optical technologies being the technology of choice for state-of-the-art long haul communication systems.

For long haul optical communications, e.g., greater than several hundred kilometers, the optical signal must be periodically amplified to compensate for the tendency of the signal to attenuate. Erbium-doped fiber amplifers (EDFAs) are one type of amplifier that is conventionally used to amplify the attenuated signals. In general, an erbium doped fiber amplifier includes a length of optical fiber doped with a few parts per million of the rare earth element erbium. The optical signal is injected into this fiber, along with light from a special "pump" laser that is designed to excite the erbium ions.

In certain situations, for an EDFA to provide optimal amplification, it is necessary to keep the length of doped fiber at a preset constant temperature. There is, thus, a need in the art for a cost effective EDFA that can maintain its erbium-doped fiber at a constant temperature.

SUMMARY OF THE INVENTION

Systems and methods consistent with the principles of the invention, among other things, provide for a controllable heater module for erbium-doped optical fiber.

One aspect of the invention is directed to a heater module. The heater module includes a predetermined length of erbium-doped optical fiber embedded in a first flexible substrate. A heater is embedded in a second flexible substrate arranged adjacent to and in contact with the first flexible substrate. A temperature sensor is embedded in the second flexible substrate.

A second aspect of the invention is directed to a heating system. The system includes a substrate having an embedded length of optical fiber, a heating element, and a temperature sensor. A first thermally insulating layer is disposed adjacent to one side of the substrate. A second thermally insulating layer is disposed adjacent to a second side of the substrate.

A third aspect of the invention is directed to a method of manufacturing a heater module. The method includes assembling a substrate including an embedded length of erbium-doped optical fiber, a heating element, and a temperature sensor. The method further includes bonding a first thermal insulating layer to one side of the substrate, and bonding a second thermal insulating layer to a second side of the substrate. Finally, the method includes packaging the assembled substrate, the first thermal insulating layer, and the second thermal insulating layer in an electrostatic discharge (ESD) package.

Another aspect of the invention is directed to a system that comprises a heating module and a control circuit. The heating module includes a predetermined length of erbium-doped optical fiber, a heating element, and a temperature sensor. A control circuit is electrically coupled to the heating module. The control circuit controls operation of the heating element based on information received from the temperature sensor.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Implementations consistent with the present invention provide for a space-efficient heater module that contains a predetermined length of erbium-doped fiber. The heater module includes a temperature sensor used to control a heater element.

Exemplary System Overview

Figure 1:
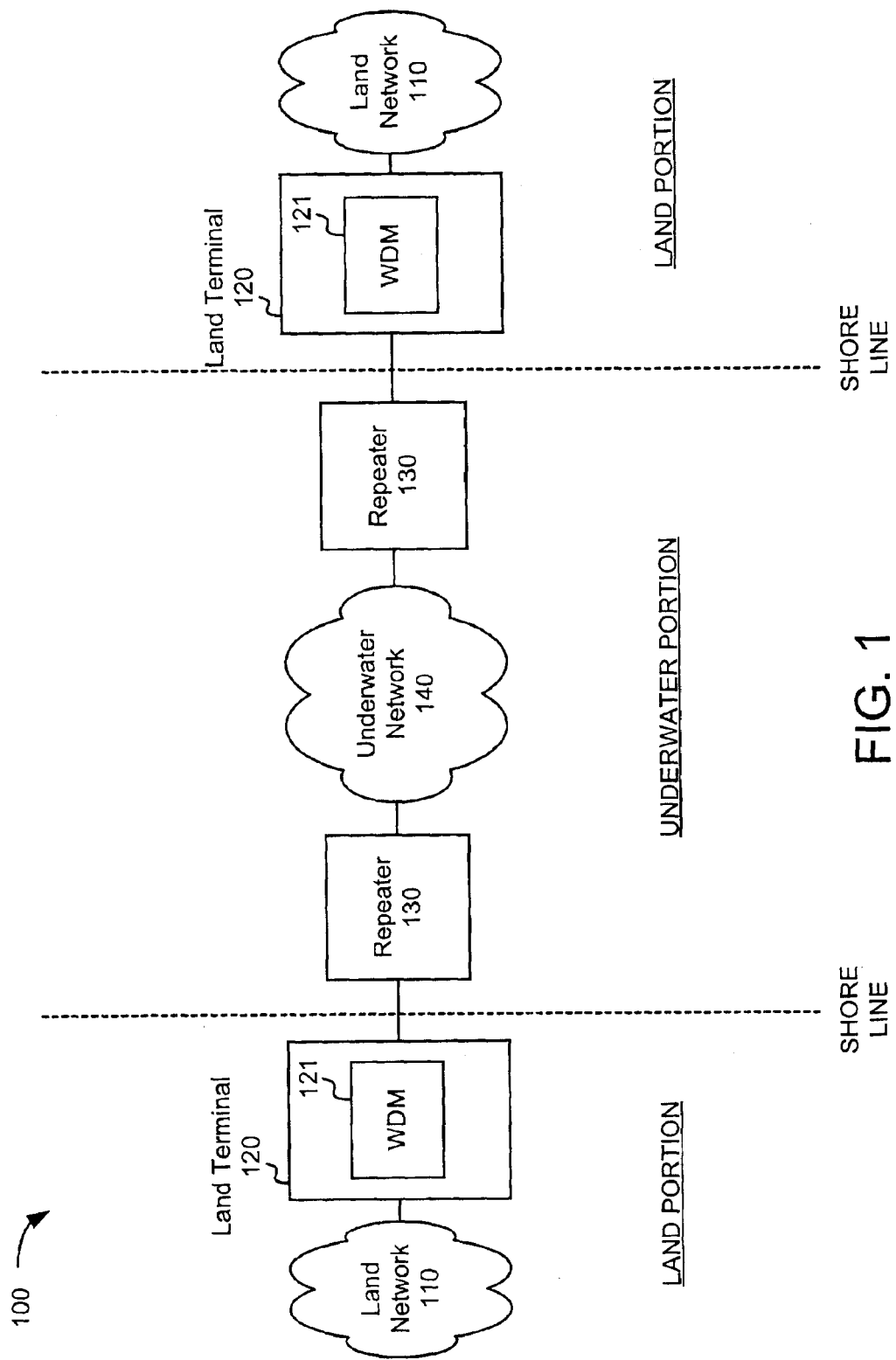
FIG. 1 illustrates an exemplary system in which systems and methods consistent with the present invention may be implemented.

FIG. 1 illustrates an exemplary system 100 in which systems and methods consistent with the present invention may be implemented. As illustrated, system 100 includes two land communication portions that are interconnected via an underwater communication portion. The land portions may include land networks 110 and land terminals 120. Land terminals 120 may include corresponding wave division multiplexing (WDM) units 121. The underwater portion may include repeaters 130 and an underwater network 140. Two land networks 110, land terminals 120, and repeaters 130 are illustrated for simplicity. It will be appreciated that a typical system may include more or fewer devices and networks than are illustrated in FIG. 1. Those skilled in the art will appreciate that the present invention is equally applicable to optical communication systems or units that are used in purely terrestrial applications, i.e., those applications which have no underwater portion.

The land network 110 may include one or more networks, such as the Internet, an intranet, a wide area network (WAN), a local area network (LAN), or another type of network. Land terminals 120 convert signals received from the land network 110 into optical signals for transmission to the repeater 130, and vice versa. The land terminals 120 may connect to the land network 110 via wired, wireless, or optical connections. In an implementation consistent with the present invention, the land terminals 120 connect to the repeaters 130 via an optical connection.

The land terminals 120 may include, for example, in addition to WDMs 121, long reach transmitters/receivers that convert signals into an optical format for long haul transmission and convert underwater optical signals back to a format for transmission to the land network 110. The land terminals 120 may also include optical conditioning units that amplify optical signals prior to transmitting these signals to repeaters 130, and line current equipment that provides power to the repeaters 130 and underwater network 140.

The underwater network 140 may include groups of repeaters and/or other devices capable of routing optical signals in an underwater environment. The repeaters 130 include devices capable of receiving optical signals and transmitting these signals to other repeaters 130 via the underwater network 140 or to land terminals 120.

Optical signals in land terminals 120 and repeaters 130 may be amplified by optical amplifiers such as EDFAs. As previously mentioned, EDFAs include a length of erbium-doped fiber. The length of fiber may be, for example, 40 meters of fiber. Consistent with the present invention, the fiber is kept at a constant temperature. This is performed by heating the fiber to a temperature that is set at a certain amount above the ambient temperature of the EDFA.

Fiber Heater Module

Figure 2:
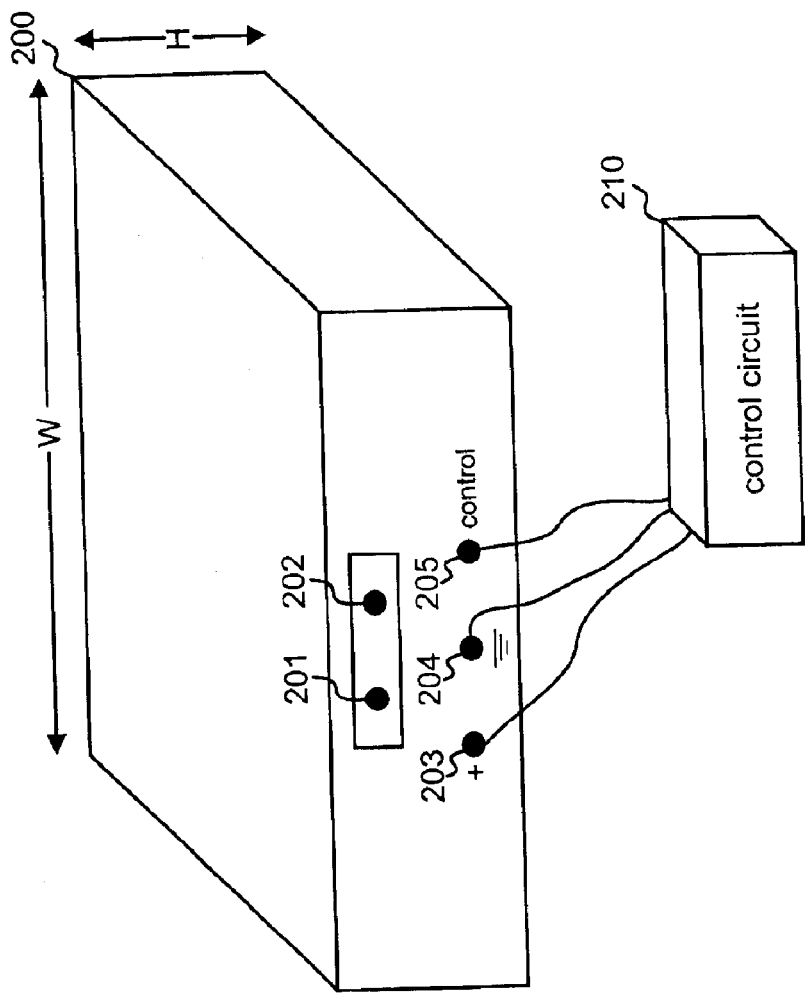
FIG. 2 is a perspective diagram of an erbium-doped fiber heater module.

FIG. 2 is a perspective diagram of an erbium-doped fiber heater module. Heater module 200 includes the erbium-doped fiber, a heating element, and a temperature sensor (see FIG. 3). Five leads are shown emanating from heater module 200. Fiber leads 201 and 202 are connect to the internal length of erbium-doped fiber. Leads 203–205 relate to the heating ability of module 200. These leads include power leads 203 and 204, and a temperature control output lead 205. Leads 203–205 are connected to a control circuit 210, which varies the power supplied to the heating element based on the temperature sourced to temperature control output lead 205.

In one implementation, heater module 200 may have a width (W) of 110 mm and a height (H) of approximately 10 mm.

Figure 3:
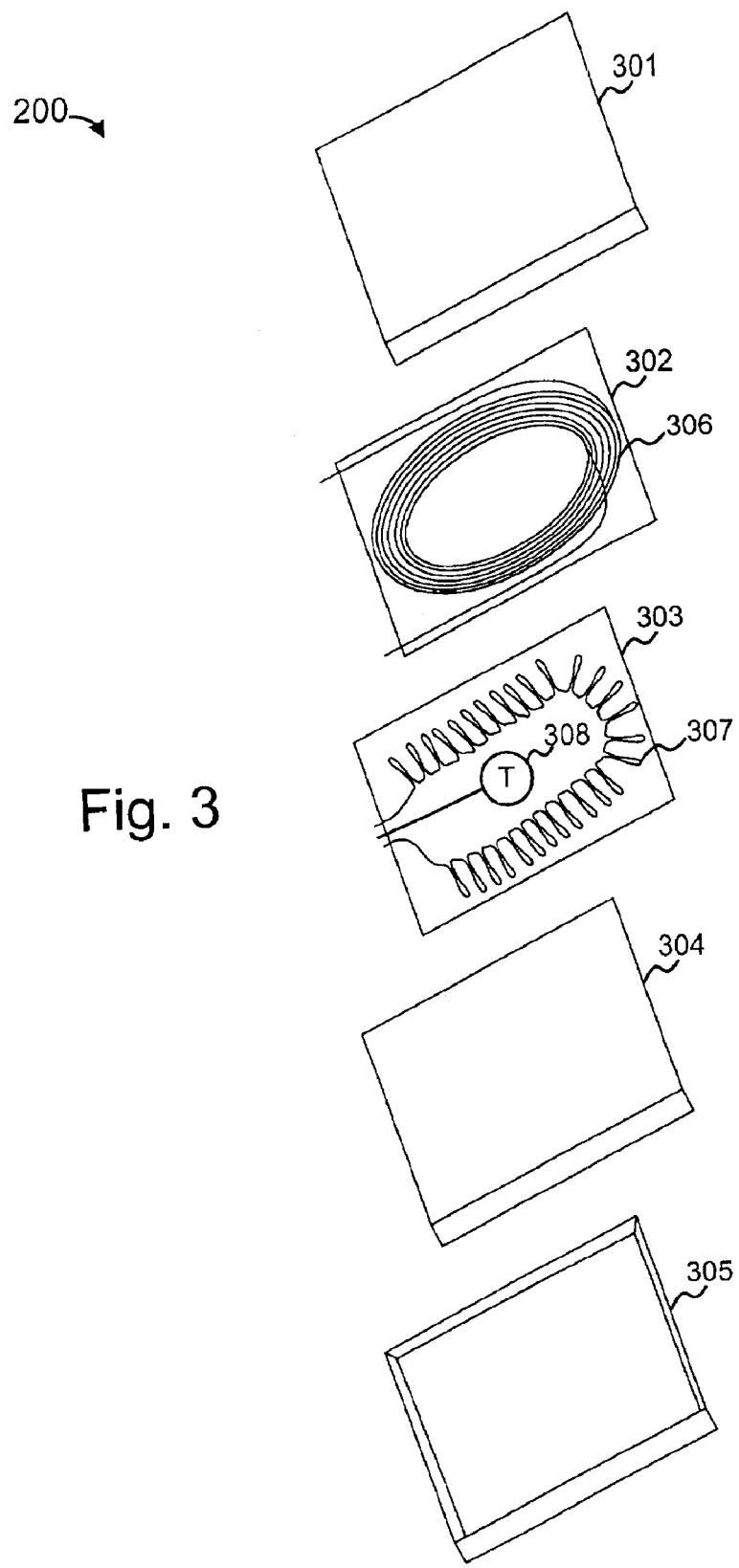
FIG. 3 is a diagram illustrating constituent layers of the heater module shown in FIG. 2.

FIG. 3 is a diagram illustrating constituent layers of heater module 200 in additional detail. As shown, heater module 200 includes a first insulation layer 301, an erbium-doped circuit layer 302, a heating layer 303, and a second insulation layer 304. Each of these layers may be stacked and mounted in an outer package 305 to thereby form heater module 200. Outer package 305 may be, for example, molded electro-static discharge resistant plastic.

Erbium-doped circuit layer 302 includes erbium-doped fiber 306. The fiber 306 may be arranged in a spiral shape to maximize the amount of fiber in layer 302. In one implementation, the fiber 306 is embedded in a flexible circuit substrate. A polymide film such as Kapton™ may be used to form the substrate for layer 302. Kapton™ is a well known flexible polyimide film and is available from the DuPont Corporation, of Wilmington, Del. Kapton™ substrates with embedded optical fiber are available from Stratos Corporation, of Chicago, Ill.

Heating layer 303 may be constructed of a thin foil heater 307 that includes a temperature sensor 308. The temperature sensor 308 may be a thermister that has a resistance that varies based on the temperature. Foil heater 307 and temperature sensor 308 may be integrated together within a flexible substrate such as a Kapton™ substrate. Flexible thermofoil heaters are commercially available companies, such as, for example, Minco Corporation, of Minneapolis Minn.

Insulation layers 301 and 304 thermally Insulate erbium-doped circuit layer 302 and heating layer 303. Thus, insulation layers 301 and 304 tend to hold the temperature of erbium-doped circuit layer 302 and heater layer 303 at a constant temperature. According to another exemplary embodiment, not illustrated, a layer of metal can be added between erbium-doped circuit layer 302 and heating layer 303. The metal layer acts as a heat capacitor, stabilizing the heat control/feedback loop.

In operation, control circuit 210 monitors the temperature of fiber 306 via the output of temperature sensor 308. When the temperature drops below a preset level, control circuit 210 activates thin foil heater 307. The target temperature of fiber 306 may be set based on the expected ambient operating temperature of the EDFA. That is, the target temperature is set at a temperature above the ambient temperature.

Method of Manufacture

Figure 4:
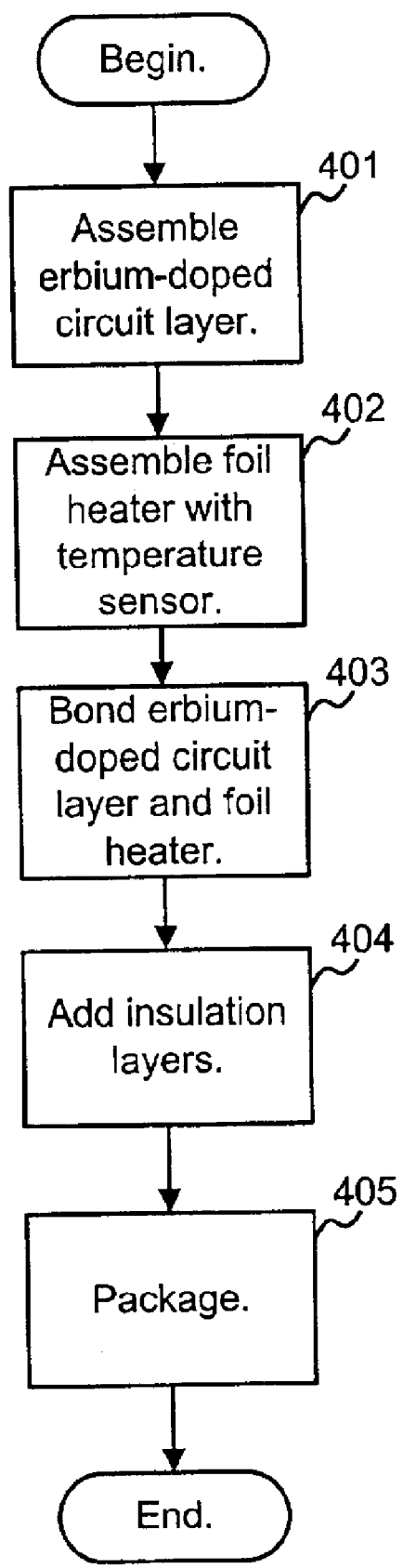
FIG. 4 is a flow chart illustrating methods consistent with the present invention for manufacturing the heater module shown in FIG. 2.

FIG. 4 is a flow chart illustrating methods consistent with the present invention for manufacturing heater module 200. To begin, erbium-doped circuit layer 302 is assembled (act 401). Heater layer 303, including a foil heating element and a temperature sensor, such as a thermister, is also assembled (act 402). The erbium-doped circuit layer 302 and the heater layer 303 are bonded 4: together (act 403). Insulation layers are bonded around both sides of the bonded circuit layer 302 and heater layer 303 (act 404). Finally, the structure generated in act 404 is packaged in molded ESD-resistant plastic (act 405).

Although erbium-doped fiber circuit layer 302 and heating layer 303 were described as two separate flexible circuit layers, these two layers could be initially assembled as a single combined layer.

SUMMARY

A relatively space-efficient erbium-doped fiber heater module was described above. The module is thermally efficient and, because it is composed of relatively few components, is highly reliable. The module further will tend to experience minimal, consistent insertion loss and minimize micro and macro bend losses in the fiber. Moreover, because the fiber and heater elements are implemented in a single module, the EDFA manufacturing process may be simplified.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. While a series of acts have been presented with respect to FIG. 4, the order of the acts may be different in other implementations consistent with the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A heater module comprising:

a predetermined length of erbium-doped optical fiber embedded in a first flexible substrate;

a heater embedded in a second flexible substrate arranged adjacent to and in contact with the first flexible substrate;

a temperature sensor embedded in the second flexible substrate; and a metal layer positioned between the first flexible substrate and the second flexible substrate.

2. A heater module comprising:
   a predetermined length of erbium-doped optical fiber embedded in a first flexible substrate;
   a heater embedded in a second flexible substrate arranged adjacent to and in contact with the first flexible substrate;
   a temperature sensor embedded in the second flexible substrate;
   a first insulation layer disposed to be in contact with the first flexible substrate; and
   a second insulation layer disposed to be in contact with the second flexible substrate.

3. The heater module of claim 2, further comprising:
   a molded electro-static discharge (ESD) resistant layer configured to provide an external package for the first flexible substrate, the second flexible substrate, the first insulation layer, and the second insulation layer.

4. The heater module of claim 3, wherein the ESD resistant layer includes power output leads and a temperature control output lead.

5. The heater module of claim 2, wherein the heater is a foil heater.

6. The heater module of claim 2, wherein the temperature sensor is a thermister.

7. The heater module of claim 2, wherein the heater is controlled to maintain the first flexible substrate at a constant temperature.

8. A system comprising:
   a heating module including
   a predetermined length of erbium-doped optical fiber,
   a heating element,
   a temperature sensor, and
   a metal layer positioned between the predetermined length of erbium-doped optical fiber and the heating element;
   a control circuit electrically coupled to the heating module, the control circuit controlling operation of the heating element based on information received from the temperature sensor.

9. A heating system comprising:
   a substrate including an embedded length of optical fiber, a heating element, and a temperature sensor;
   a first thermally insulating layer disposed adjacent to a first side of the substrate; and
   a second thermally insulating layer disposed adjacent to a second side of the substrate.

10. The heating system of claim 9, further comprising:
    a molded electrostatic discharge (ESD) resistant layer configured to provide an external package for the substrate, the first thermally insulating layer, and the second thermally insulating layer.

11. The heating system of claim 10, wherein the ESD resistant layer includes power output leads and a temperature control output lead.

12. The heating system of claim 9, wherein the substrate includes:
    a first flexible substrate that includes the optical fiber; and
    a second flexible substrate that includes the heating element and the temperature sensor.

13. The heating system of claim 9, wherein the heating element is a foil heater.

14. The heating system of claim 9, wherein the temperature sensor is a thermister.

15. The heating system of claim 9, wherein the heating element is controlled to maintain the substrate at a constant temperature.

16. The heating system of claim 9, wherein the optical fiber is erbium-doped optical fiber.

17. A method of manufacturing a heater module comprising:
    assembling a substrate including an embedded length of erbium-doped optical fiber, a heating element, and a temperature sensor;
    bonding a first thermal insulating layer to one side of the substrate;
    bonding a second thermal insulating layer to a second side of the substrate; and
    packaging the assembled substrate, the first thermal insulating layer, and the second thermal insulating layer in an electro-static discharge (ESD) package.

18. The method of claim 17, further including:
    packaging the heater module to include externally connectable leads for the heating element and the temperature sensor.

19. A heater module comprising:
    means for containing a predetermined length of erbium-doped optical fiber;
    means for heating the predetermined length of erbium-doped optical fiber;
    means for sensing the temperature of the predetermined length of erbium-doped optical fiber;
    means for controlling the means for heating to maintain the predetermined length of erbium-doped optical fiber at a constant temperature based on an output of the means for sensing the temperature;
    first insulation means, disposed to be in contact with and adjacent to the means for containing; and
    second insulation means, disposed to be in contact with and adjacent to the means for heating.

20. A system comprising:
    a heating module including
    a predetermined length of erbium-doped optical fiber,
    a heating element, and
    a temperature sensor;
    a control circuit electrically coupled to the heating module, the control circuit controlling operation of the heating element based on information received from the temperature sensor; and
    a molded electro-static discharge (ESD) resistant layer configured to provide an external package for the first flexible substrate and the second flexible substrate,
    wherein the length of erbium-doped fiber is embedded in a first flexible substrate and wherein the heating element and the temperature sensor are embedded in a second flexible substrate.

21. The system of claim 20, wherein the heating element is controlled to maintain the heating module at a constant temperature.

22. The system of claim 20, wherein the ESD resistant layer includes power output leads and a temperature control output lead.

23. The system of claim 20, wherein the heating element is a foil heater.

24. The system of claim 20, wherein the temperature sensor is a thermister.

* * * * *

UNITED STATES PATENT AND TRADEMARK OFFICE
CERTIFICATE OF CORRECTION

PATENT NO. : 6,937,796 B2
DATED : August 30, 2005
INVENTOR(S) : Robert M. Adams et al.

It is certified that error appears in the above-identified patent and that said Letters Patent is hereby corrected as shown below:

Column 5,
Line 3, the word "beater" should be spelled as -- heater --.

Signed and Sealed this

Twenty-second Day of November, 2005

JON W. DUDAS
*Director of the United States Patent and Trademark Office*